Feb. 16, 1965  D. S. SHERIDAN  3,169,527
LUBRICATED CATHETER
Filed May 13, 1963
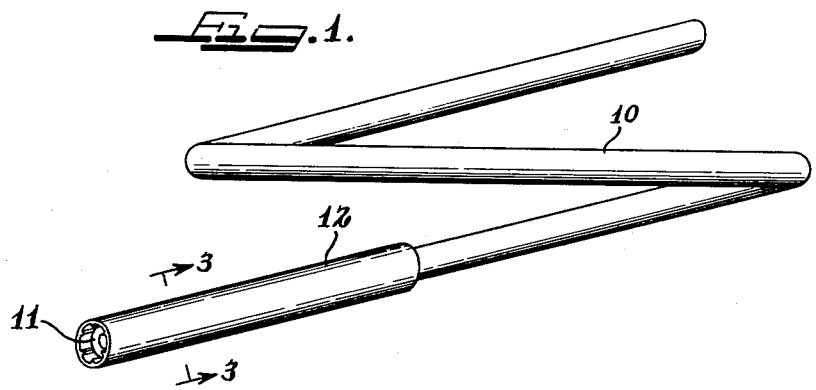
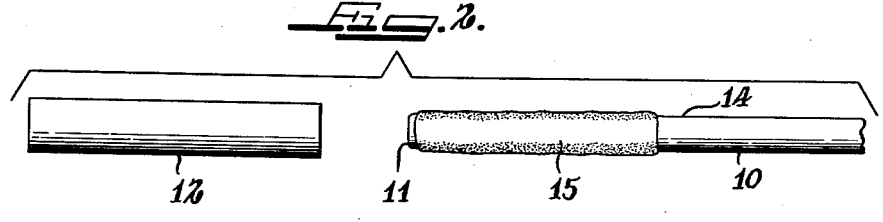
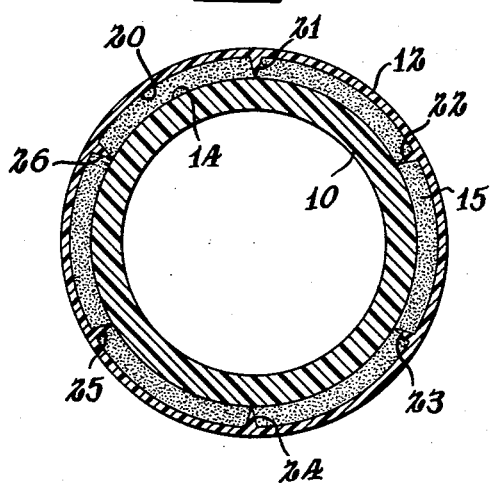
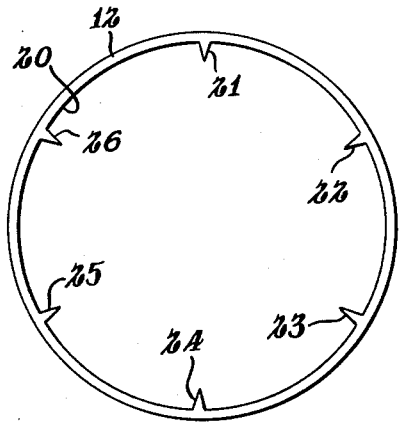
INVENTOR.
DAVID S. SHERIDAN
BY Hofgren, Wegner,
Allen, Stellman & McCord
Attys.

United States Patent Office 3,169,527
Patented Feb. 16, 1965

3,169,527
LUBRICATED CATHETER
David S. Sheridan, Argyle, N.Y., assignor to Sheridan Corporation, a corporation of New York
Filed May 13, 1963, Ser. No. 279,867
3 Claims. (Cl. 128—349)

The present invention relates to lubricated catheters and more particularly to prelubricated catheters and tubes which are ready for immediate use.

In medical procedures which utilize catheters or tubes, it is often necessary to lubricate the catheter or tube before their insertion into the body. Enema procedures and catheterization procedures are typical examples requiring lubrication prior to insertion. At the present time, such procedures either utilize individual packets of jelly which are squeezed out onto catheters or tubes or which are squeezed out on towels and wiped onto the tubes. Therefore, a catheter or tube is not normally lubricated except immediately prior to its insertion. The present invention eliminates the necessity for delaying such procedures while a catheter or tube is lubricated by providing prelubricated catheters and tubes which are stored in a prepared condition for immediate utilization whenever required.

Thus, an object of the present invention is to provide a new and improved lubricated catheter.

Another object is to provide prelubricated medical tubes for insertion into the body.

An additional object is to provide a cover for a distal end of a medical tube which has its inner wall surface spaced from the outer wall surface of a medical tube.

A further object is to provide a medical tube having a portion of its outer wall surface adjacent its distal end covered with a lubricant that is protected from being inadvertently removed by a sleeve having an inner wall surface spaced from the outer wall surface of the medical tube and sufficiently gripping the outer wall surface of the medical tube to prevent it slipping off the tube during transportation and storage and yet being easily manually removable just prior to insertion into the body.

Further objects and advantages will become apparent from the following detailed description taken in connection with the accompanying drawing, in which:

FIGURE 1 is a perspective view of an embodiment of the present invention;

FIGURE 2 is an elevational view of a portion of the embodiment illustrated in FIGURE 1 with component parts disassembled;

FIGURE 3 is an enlarged sectional view taken along the line 3—3 of FIGURE 1; and FIGURE 4 is an end elevational view of a component of the embodiment of the invention shown in FIGURES 1, 2 and 3.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Prior to the present invention, catheters and medical tubes have not been prelubricated because no structure was provided to prevent the removal of the lubricant if a catheter or medical tube were placed on any type of a supporting surface. Further, prior to the present invention, there being no cover to protect the end of the catheter once it was lubricated, there was no way of preventing the cohesiveness of a lubricant from aiding the possibility of contamination. The present invention not only makes it possible to have a prelubricated catheter or medical tube ready for immediate utilization at any time, but it also prevents inadvertent removal of the lubricant until just prior to the insertion of the catheter or tube and prevents the lubricant from increasing the probability of contamination.

Referring to FIGURE 1, a flexible, clear, plastic, elongated, medical tube in the form of a catheter 10 has a distal end 11 which is covered by a blue-tinted flexible transparent plastic sleeve 12. FIGURE 2 shows the sleeve 12 removed from the portion of the catheter 10 adjacent to the distal end 11 to reveal a layer of lubricant such as Vaseline adhering to a portion of the outer wall surface adjacent to the distal end 11. FIGURE 3 more clearly illustrates the lubricant 15 interposed between the catheter 10 and the sleeve 12. Referring now specifically to FIGURES 3 and 4, an inner wall surface 20 of the sleeve 12 has a series of six ribs 21–26 extending longitudinally along the inner wall of the sleeve and projecting radially inwardly to engage the outer wall surface 14 of the tube 10. The ribs 21–26 are triangular in cross section with a small included angle, tapered inwardly to substantially a knife edge and are molded as an integral part of the sleeve 12. The diametrical dimension between the apexes of each pair of opposing ribs 21–24, 22–25, and 23–26 is slightly less than the diameter of the external wall surface 14.

A prelubricated catheter is produced by placing a layer of lubricant such as Vaseline over a portion of the external wall surface 14 adjacent the distal end 11 as shown in FIGURES 2 and 3. The sleeve 12 is then slid without rotating it over the lubricant 15 as shown in FIGURES 1 and 3. The entire assembly may then be sterilized and placed in a plastic sterile bag for shipment or storage. When the prelubricated catheter, as shown in FIGURE 1, is removed from the bag, it is then ready for immediate use. A doctor or medical technician may then manually slide the sleeve 12 off the catheter 10 without twisting it so that the ribs do not tend to wipe off the lubricant 15. The distal end 11 is then inserted into a body. Since it is lubricated, it will slide into a body opening with less frictional resistance.

The tendency of the sleeve 12 to slide off of the distal end 11 because the lubricant 15 tends to reduce the frictional connection between them is counteracted by the apexes of the six ribs 21–26, which not only pierce through the layer of lubricant 15 when the sleeve 12 is slid onto the catheter, but also engage tightly the outer wall surface 14. Since the catheter 10 and the ribs 21–26 are flexible, the apexes of the ribs tend to penetrate or indent the external wall surface 14, as shown in FIGURE 3, without damaging the surface. Thus, a snug engagement between the apexes of the ribs and the external wall surface is effected, and any lubricant that would otherwise be between them tends to be forced away as the sleeve is slid onto the catheter. The sleeve 12 resists inadvertent removal even when the distal end of the catheter is bumped against other objects or an end of the sleeve 12 is brought into contact with other objects. Sleeve 12 is tinted blue so that its presence on the catheter is easily visually recognized so that a doctor or medical technician can quickly tell the status and position of the cap over the lubricant. The blue color is not in itself critical, for any set of contrasting colors between the catheter and the sleeve will serve the purpose of quickly identifying the presence of the cover on the catheter.

The lubricant 15 is preferably transparent and colorless so that when it is placed upon a transparent catheter or medical tube it will not destroy the transparent capability even near the distal end. However, any color of lubricant could be utilized.

Although the ribs 21–26 extend longitudinally for the full length of the sleeve 12, the sleeve can be modified so that the ribs either extend only over a portion of the length of the sleeve or are intermittent along the length of the sleeve. Another modified form of sleeve would be provided by replacing the ribs with a spaced series of projections extending radially inwardly from the internal wall surface of the sleeve to the external wall surface of the catheter. Although six ribs are shown in the embodiment of the invention illustrated in the figures, the number of ribs could be reduced to three or increased in number to a much larger number. All such variations and modifications are intended to be within the scope of the present invention.

I claim:
1. The combination of:
   a flexible elongated hollow tube having a distal end and an external wall surface portion adjacent the distal end,
   a flexible hollow sleeve having an internal wall surface greater in circumference than said tube external wall surface portion,
   a plurality of ribs radially inwardly projecting from said sleeve internal wall surface and slidingly removably engaging said tube external wall surface portion to space said sleeve internal wall surface from said tube external wall surface portion, and
   a normally nonflowing lubricant interposed between said tube and sleeve.
2. The combination specified in claim 1 wherein said sleeve is visually contrasting in color to said tube.
3. The combination of:
   an elongated medical instrument having a distal end and an external wall surface portion adjacent the distal end,
   a normally nonflowing lubricant spread over said external wall surface portion,
   a hollow sleeve adapted to cover said lubricant and having an internal wall surface greater in circumference than said external wall surface portion, and
   a plurality of ribs longitudinally extended along said sleeve internal wall surface, radially inwardly projecting from said sleeve internal wall surface, and slidingly removably engaging said external wall surface portion to space said sleeve internal wall surface from said external wall surface portion.

References Cited in the file of this patent
UNITED STATES PATENTS

| | | |
|---|---|---|
| 1,871,508 | Gardner | Aug. 16, 1932 |
| 1,888,349 | Jacoby | Nov. 22, 1932 |
| 2,784,716 | Broman | Mar. 12, 1957 |
| 2,848,998 | Bryan | Aug. 26, 1958 |
| 2,863,453 | Gewecke | Dec. 9, 1958 |
| 3,015,332 | Brecht | Jan. 2, 1962 |